US006622567B1

(12) United States Patent
Hamel et al.

(10) Patent No.: US 6,622,567 B1
(45) Date of Patent: Sep. 23, 2003

(54) MICROPOWER PEAK STRAIN DETECTION SYSTEM FOR REMOTE INTERROGATION

(75) Inventors: Michael John Hamel, Williston, VT (US); Christopher Prvyn Townsend, Shelburne, VT (US); Steven W. Arms, Williston, VT (US)

(73) Assignee: Microstrain, Inc., Williston, VT (US)

( * ) Notice: Subject to any disclaimer, the term of this patent is extended or adjusted under 35 U.S.C. 154(b) by 0 days.

(21) Appl. No.: 09/801,230

(22) Filed: Mar. 7, 2001

Related U.S. Application Data (63) Continuation-in-part of application No. 09/259,615, filed on Mar. 1, 1999.
(60) Provisional application No. 60/187,486, filed on Mar. 7, 2000.

(51) Int. Cl.[7] ................................................ G01M 5/00
(52) U.S. Cl. .......................................... 73/786; 73/789
(58) Field of Search ................................ 73/705, 146.5, 73/789, 786, 724, 718; 422/82.02; 324/207.18, 207.2; 340/870.35, 572.2, 572.6; 705/29, 16

(56) References Cited

U.S. PATENT DOCUMENTS

| | | | |
|---|---|---|---|
| 3,798,454 A | | 3/1974 | Weiss |
| 4,987,783 A | * | 1/1991 | D'Antonio ............... 73/862.64 |
| 5,086,651 A | | 2/1992 | Westermo et al. |
| 5,539,402 A | | 7/1996 | Bozeman |
| 5,914,593 A | * | 6/1999 | Arms et al. ............ 324/207.12 |
| 5,969,260 A | * | 10/1999 | Belk et al. .................... 73/773 |
| 6,144,300 A | * | 11/2000 | Dames .................... 340/572.2 |

FOREIGN PATENT DOCUMENTS

WO   WO 87/00951   2/1987

OTHER PUBLICATIONS

"Multichannel Strain Guage Telemetry for Orthopaedic Implants", by G. Bergman et al., J. Biomechanics, vol. 21, No. 2, pp 169–176, 1988.
"Remotely Powered, Multichannel Microprocessor Based Telemetry Systems . . . ", by C.P. Townsend et al., Proc. SPIE Smart Structures & Materials, Newport Beach, CA, Mar. 1999.
"Capacitive Sensors Design and Applications", by L.K. Baxter, IEEE Press on Electronics Technology, NY, NY, 1997.
"An Advanced Strain Level Counter for Monitoring Aircraft Fatigue", by D.E. Weiss, Instrument Society of America, ASI 72212, pp. 105–108, 1972.
"Microminiature, High Resolution, Linear Displacement Sensor for Peak Strain Detection in Smart Structures", by S.W. Arms et al., Proc. SPIE Smart Structures & Materials, San Diego, CA.

* cited by examiner

Primary Examiner—Harshad Patel
(74) Attorney, Agent, or Firm—James M. Leas (57) ABSTRACT

A sensing device includes an RFID chip and a differential variable reluctance transducer (DVRT) sensor that can be read remotely with electromagnetic power provided to the device from a remote reader. The ac signal provided to the device by inductance is used for powering the RFID chip and exciting the sensor. Data read from the sensor can also be transmitted back to the reader using the power provided by the reader. The sensor circuit uses a lower amount of current than the RFID chip, so it does not contribute appreciably to device power requirements.

52 Claims, 5 Drawing Sheets

MICROPOWER PEAK STRAIN DETECTION SYSTEM FOR REMOTE INTERROGATION

RELATED APPLICATION

This application is a continuation in part of U.S. patent application Ser. No. 09/259,615 filed on Mar. 1, 1999, and claims benefit to Provisional No. 60/187,486 filed Mar. 7, 2000.

FIELD OF THE INVENTION

This invention generally relates to sensors. More particularly, it relates to a system for remote interrogation of a sensor. Even more particularly, it relates to an improved circuit for low power interrogation.

BACKGROUND OF THE INVENTION

Smart sensors are being developed for use in roads, bridges, dams, buildings, towers, and vehicles. The sensors may provide many types of information, including displacement, strain, speed, acceleration, temperature, pressure, and force. For remote sensing one challenge has been to provide sensors that consume very low power for reading the sensor and transmitting the data.

For example, a major contributing factor to the deterioration of the nation's bridges are overloads. These overloads could be caused by heavy trucks or a seismic event. Reliable, inexpensive, and easy to implement sensors that detect and measure the peak loads experienced by a bridge would be useful from a bridge management perspective and as a tool to make the most efficient use of bridge inspection resources Available sensors have required continuous energizing either for operation or for data transmission, and have required substantial power supplies. For example, a paper, "Multichannel Strain Gauge Telemetry for Orthopaedic Implants," by G. Bergmann, et al., J. Biomechanics Vol. 21 no. 2 pp 169–176, 1988, describes remote powering of a Wheatstone bridge with active strain gauges that require continuous power. A paper, "Remotely powered, multichannel, microprocessor based telemetry systems for smart implantable devices and smart structures," by Chrisopher Townsend, et al, describes an implantable sensor telemetry system that uses low power microprocessors integrated circuits, Wheatstone bridge signal conditioning, and a remote powering system. The Wheatstone bridge has advantage in providing temperature compensation. However, the bridge circuit also requires a continuous voltage and flow of current, so substantial energy is eventually used. Conventional Wheatstone bridge signal conditioners, such as Townsend's, require instrumentation amplifiers and analog to digital converters which increase the power demand, size, and complexity of these systems.

International patent WO 87/00951 shows an inductive sensor used as the feedback element in an astable multivibrator. This circuit requires a non-differential sensor, which results in poor temperature stability. In addition, the astable multivibrator requires continuous power to operate.

A book, "Capacitive sensors design and Applications," by L. K. Baxter, IEEE Press, 1997, shows a microcontroller providing a train of pulses or a microcontroller providing a single interrogation pulse to excite a capacitive limit switch. However, the circuit described by Baxter does not provide a way to measure more than the two positions of the capacitor and does not compensate for changes in temperature.

A paper, "Microminiature, high resolution, linear displacement sensor for peak strain detection in smart structures," by Steven W. Arms, et al., proceedings of the SPIE 5$^{th}$ Annual International Conference on Smart Structures and Materials, San Diego, Calif., Mar. 1–5, 1998, describes a differential method of capturing the peak displacement of a member attached to a structure without requiring any power. The paper did not describe micropower methods for remote interrogation.

A paper, "An Advanced Strain Level Counter for Monitoring Aircraft Fatigue", by D. E. Weiss, Instrument Society of America, ASI 72212, 1972, pages 105–108, describes an inductive strain measurement system which measured and counted strain levels for aircraft fatigue. The system includes an LVDT, signal conditioning, and a data recorder, and required power of 28V.

U.S. Pat. No. 3,798,454 1974 to Weiss describes an optical method for counting, classifying according to magnitude, and recording acceleration signals. The system is resettable, small, and light weight but requires power for operation.

U.S. Pat. No. 5,539,402 to Bozeman described a device capable of electrically recording maximum sensed values, using microfuses. The device converts the analog acceleration signal of an accelerometer to digital levels and connects this digital output to a microfuse memory device. A signal on a particular output line triggers an associated microfuse in the memory device. This system is useful for storing maximum accelerations, and has the advantage of storing information reliably even if power is lost after data has been stored. The system requires battery power to measure and record maximum accelerations.

Fiber optic strain sensors are a popular way to monitor structures, since several very long optical fibers can be used to gather distributed strain and temperature data from many points over very large structures. However, these sensors require expensive equipment for monitoring and acquiring data. They also require special care during installation to prevent fiber breakage during the construction process. Fiber optic connectors, which allow the embedded fibers to egress from the structure in order to be interrogated by external equipment, adds to construction costs and to the difficulty of sensor installation. Furthermore, like previously described systems, they also require power, which can fail at critical moments, such as during a violent storm when important data needs to be collected Conventional bonded foil strain gages are subject to drift due to delamination of their bond to the structure under test over time, and with exposure to moisture. Considerable surface preparation of the structure, and exotic coating steps are required in order to maintain reasonable short term recordings from a bonded gauge to be exposed to the environment. More stable vibrating wire strain gauges are typically welded to the structure under test, but these welds may cause localized corrosion. Furthermore, neither bonded or vibrating wire strain gauges include a way to passively detect peak displacements or strains.

Sensing systems for civil structures may be powered by batteries and/or solar panels, with multiple sensors requiring long cable runs and connectors. Totally wireless systems eliminate cabling and connector costs, but typically require batteries to be deployed at each sensing node. In order to capture a peak strain event, these batteries must power the sensor continually and may need to sample and log data at high rates. Passive strain sensors do not require power; these can be interrogated(and powered) later to assess damage to load bearing elements.

U.S. Pat. No. 5,086,651 to Westermo and Thompson describes a passive peak strain sensor that uses TRansformation Induced Plasticity (TRIP) steels. However, this sensor cannot be calibrated over its full operating range without irreversible damage to the sensor and the device can only be used once—since TRIP material yielding is an irreversible effect. In addition the sensor is large in size, has low resolution, and is inherently non-linear.

U.S. Pat. No. 5,914,593 to Arms et al. describes a temperature gradient compensation circuit for two kinds of DVRTs. The first kind, shown in FIG. 4 of the patent, is a core type DVRT which utilizes two coils to detect the change of position of a ferrous or conductive core. The second kind, shown in FIG. 5 of the patent, uses a coil encapsulated within a sensor housing to sense the distance from a conductive or ferrous target. The first kind may touch and the second kind does not touch the target.

Thus, a better system for acquiring and transmitting data is needed that uses less energy and that provides temperature compensation, and this solution is provided by the following invention.

SUMMARY OF THE INVENTION

It is therefore an object of the present invention to provide a circuit for reading sense data that directly uses ac power from a remote source;

It is a further object of the present invention to lower power requirements for a sensor by providing a circuit in which power received from a remote source is used directly, without rectification;

It is a further object of the present invention to provide a differential sensor in a Wheatstone bridge configuration with an ac signal from a remote power supply to provide a low power data sensing circuit;

It is a feature of the present invention that the Wheatstone bridge provides for a temperature compensated reading of the differential sensor;

It is a further feature of the present invention that the remotely powered interrogation system provides ac power for running the sensor; and It is an advantage of the present invention that the circuit for reading a sensor uses very low power.

These and other objects, features, and advantages of the invention are accomplished by an electronic device, comprising a first coil for receiving an electromagnetic signal from a remote source, wherein the electromagnetic signal induces an ac voltage signal in the first coil. The device also includes a circuit comprising a first element and a second element. The first element is changed by movement of a mechanical member. The first element voltage signal derived from the first coil. The second element uses dc voltage obtained from an ac voltage signal derived from the first coil.

Another aspect of the invention is accomplished by an electronic device, comprising a first coil for receiving an electromagnetic signal from a remote source, wherein the electromagnetic signal induces an ac voltage signal in the coil. The device also includes a circuit comprising a first element and a second element; The first element comprising a sensor. The sensor uses an ac voltage signal derived from the first coil. The second element uses dc voltage obtained from an ac voltage signal derived from the first coil.

Another aspect of the invention is accomplished by a method of reading a remote sensing device. The method includes the the step of bringing a reader in range of a remote sensor. The remote sensor comprises a first coil for receiving an electromagnetic signal from the reader. The electromagnetic signal induces an ac voltage signal in the first coil. The remote sensor further comprises a circuit having a first element and a second element. The first element includes a sensor, wherein the sensor uses an ac voltage signal derived from the first coil. The second element uses dc voltage obtained from an ac voltage signal derived from the first coil.

Another aspect of the invention is accomplished by a method of reading a remote sensing device. The method includes the step of bringing a reader in range of a remote sensor. The remote sensor comprises a first coil for receiving an electromagnetic signal from the reader. The electromagnetic signal induces an ac voltage signal in the first coil. The remote sensor further comprises a circuit comprising a first element and a second element. The first element is changed by movement of a mechanical member. The first element uses an ac voltage signal derived from the first coil. The second element uses dc voltage obtained from an ac voltage signal derived from the first coil.

BRIEF DESCRIPTION OF THE DRAWINGS

The foregoing and other objects, features, and advantages of the invention will be apparent from the following detailed description of the invention, as illustrated in the accompanying drawings, in which.

DETAILED DESCRIPTION OF THE INVENTION

The present inventors recognized that circuitry could be simplified and substantially less energy could be used by a sensor configured as part of a Wheatstone bridge if remote ac power could be used directly, without rectification. In essence the sensor could then be read along with radio frequency identification (RFID) tag information without any local power source. Power is only used when remote power is available for measuring and interrogation. Then the ac signal induced in the device directly provides ac signal for the measurement and dc power for the RFID to provide a return signal with identification and sensor information. In one embodiment of a peak strain detector, the sensor information indicates whether a preset inductance threshold has been exceeded. Extremely low current is needed, in the range of microamperes to read the sensor.

This application is a continuation of U.S. patent application Ser. No. 09/259,615 ("the '615 application"), filed Mar. 1, 1999, and incorporated herein by reference. The '615 application describes a passive, peak strain detection device based on a microminiature differential variable reluctance transducer (DVRT). The core of a DVRT (see FIG. 3) moves in response to structural deformation, but the core is then held by the constraint of a circumferential entrapment collar, at the peak of structural deformation. The DVRT can be designed to capture either tensile or compressive peak strains. Neither the core movement to capture the peak deformation nor the constraint requires power, so the device is inherently passive. The high compliance of the device is advantageous, since its physical attachments to the structure are relatively unstressed. DVRT's are linear (1% nonlin.), temperature compensated, fully calibrated, and submersible. Their high resolution (0.16 microns at 0.5 Hz, or 16 microstrain w/10 mm gauge length), low mass (30–60 milligrams), and small diameter (1.5 mm) allow access to tight areas with minimal influence on the structure under test. The microminiature DVRT's used in our previous study achieved a resolution of 0.25 microns at a bandwidth of 80 Hz.

The DVRT measures only 1.5 mm in outside diameter, features stroke lengths up to 9 mm, and has a body length to stroke ratio of 2.6 to 1. It features a superelastic nickel titanium core, which provides outstanding flexibility and resistance to kinking and permanent deformation. Its differential arrangement cancels out temperature effects and amplifies linear position, and is capable of operating at temperatures up to 175 deg. Celsius.

Because the DVRT peak strain detector can hold a strain value without power, it is a good choice for combination with passive RFID interrogation systems. These RFID systems do not need embedded batteries, but harvest electromagnetic energy emitted by an external reader, or remote interrogation system. The combination of passive peak strain detection with low cost, passive interrogation systems described in the present invention allows very low cost monitoring systems to be employed, without limitations imposed by cabling, connectors, or batteries.

RFID tags allow for reading tag data, such as an ID number, at distances of up to 5–6 feet away, without requiring any battery source on the remote tags. A remote source of radio frequency radiation supplies the tag with the needed power. The remote tags typically draw currents on the order of seven microamps, therefore, if a signal conditioner could be designed for reading a DVRT sensor and that consumed abut this amount of current, then a sensor with an RFID tag could be read at a range of several feet from the remote power source.

The simplest signal conditioning circuit is one that detects whether a threshold has been exceeded without actually reading the value of inductance or displacement. A prototype was constructed that detected when a preset value of inductance a threshold value of inductance—had been exceeded. A circuit was developed that minimized the power required to obtain the threshold reading from the sensor.

Figure 1:
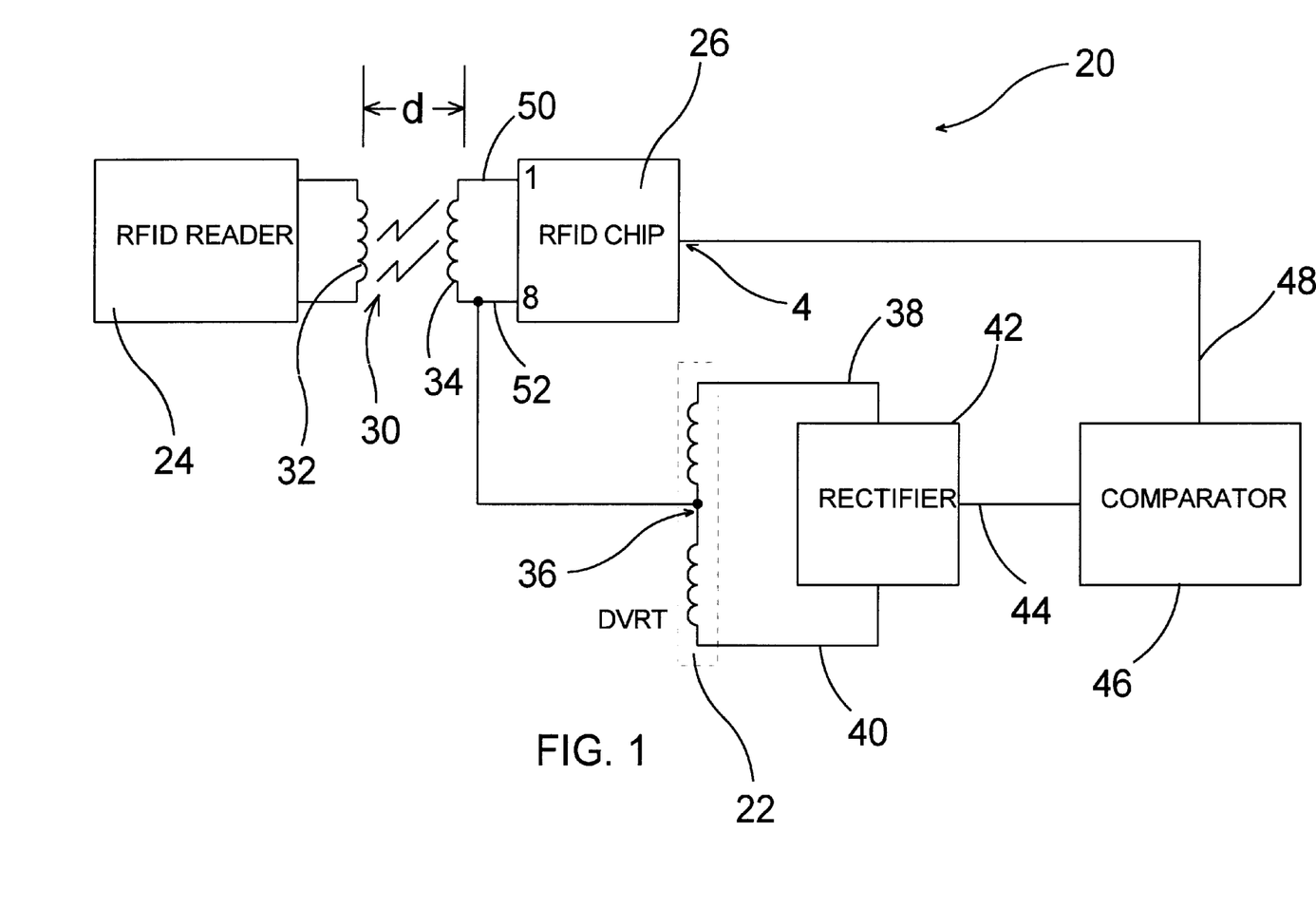
FIG. 1 is a block diagram of an RFID reader, and a sensing unit comprising an RFID chip, a DVRT, a rectifier, and a comparator.
Figure 2:
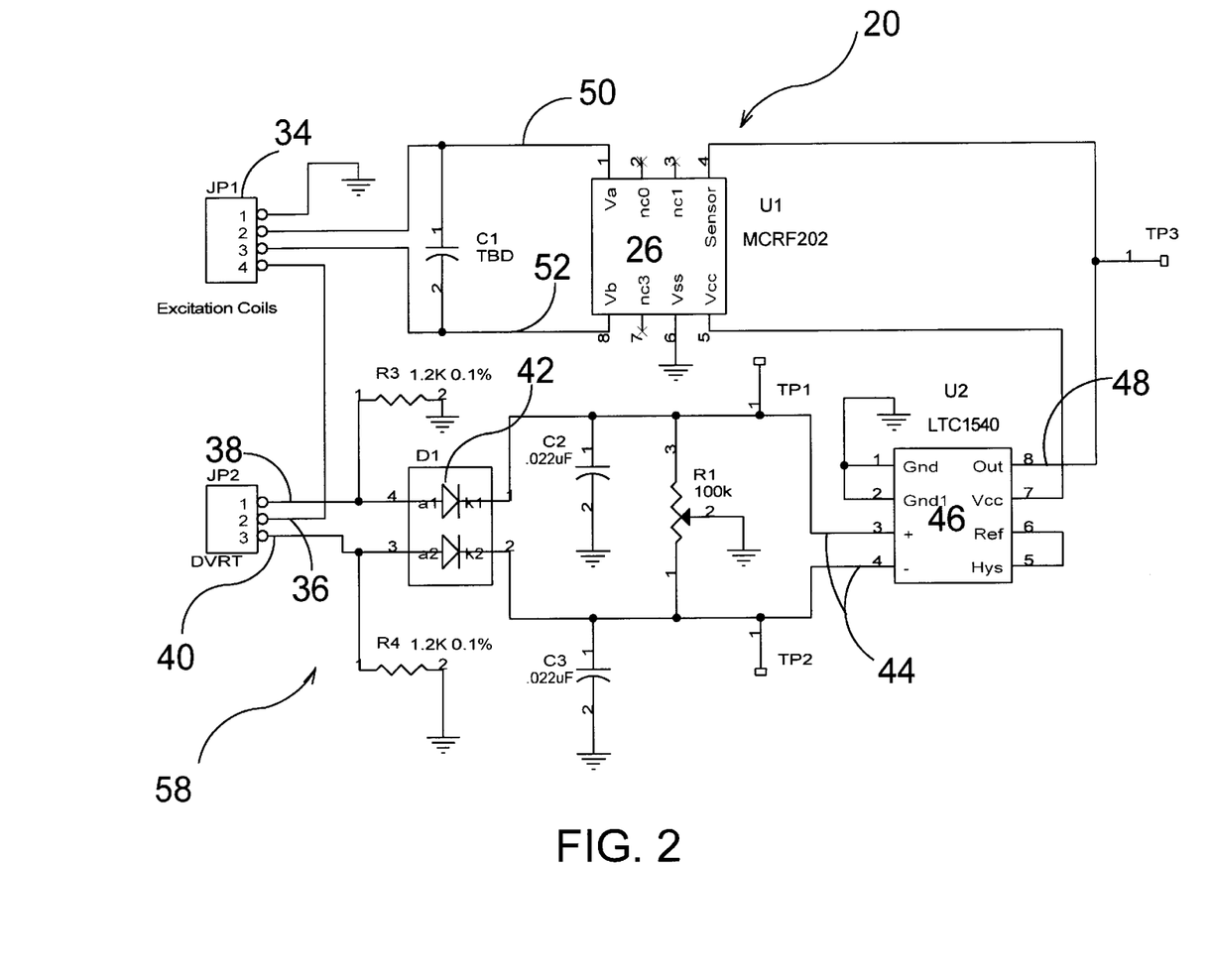
FIG. 2 is a circuit diagram showing components included in the block diagram of FIG. 1.

This circuit, shown in block diagram in FIG. 1 and with circuit components in FIG. 2, uses so little power that it can be remotely interrogated as a passive device. Circuit 20 is temperature stable and is compatible with resistive, capacitive, inductive or resonant sensors, such as DVRT 22. It is also tolerant of changes in distance between it and RFID reader 24. Circuit 20 is used in association with RFID tag chip 26 (U1), such as MicroChip IC MCRF202, MicroChip Technoloogies, Chandler, Ariz., that is designed to accept a logic level input at pin 4. A differential sensor, such as MicroStrain's peak detecting DVRT 22, is energized with 125 KHz carrier wave 30 derived from coil 32 of remote source of power, RFID reader 24, received by coil 34, and applied to center tap 36 of DVRT sensor 22. The electromagnetic signal provided by coil 32 of RFID reader 24 induces an ac signal in coil 34 and this ac signal is used by DVRT sensor 22. Differential outputs 38, 40 of sensor 22 are applied to matched pair of rectifier diodes 42.

Figure 5:
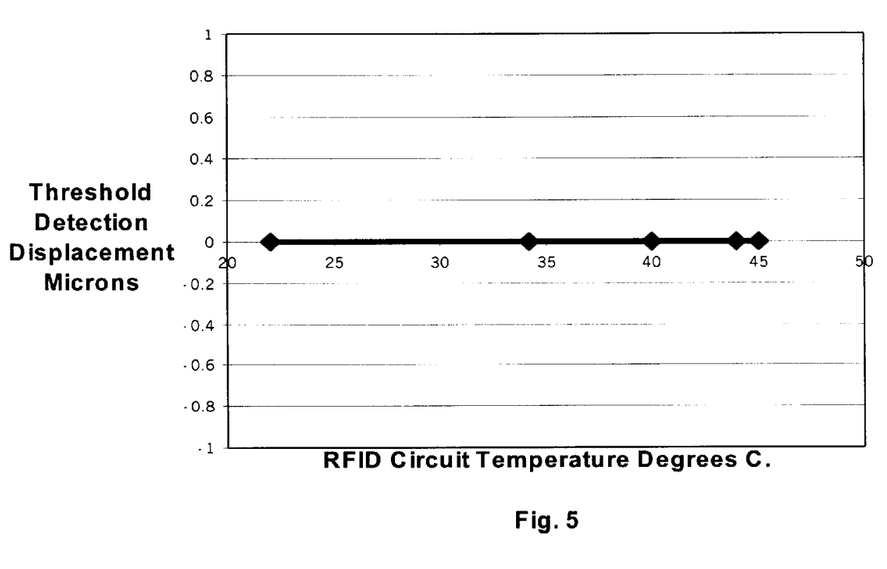
FIG. 5 is a graph showing RFID circuit temperature vs. threshold detection displacement.

Diodes 42 and capacitors C2, C3 provide differential DC voltage 44 proportional to the peak excitation AC voltage appearing at the ends of sensor 22 or sides of Wheatstone bridge 58. Resultant differential DC signal 44 is proportional to the position of core 45 (FIG. 5) in DVRT sensor 22. DVRT sensor 22 is an example of a first element of circuit 20 that uses an ac signal derived from coil 34. DVRT sensor 22 provides its differential output signal between wires 38 and 40, and this output signal depends on position of a mechanical member, core 45. This differential signal is rectified by diodes 42 and applied to differential inputs +/− of nanopower comparator 46 (U2) such as LTC1540, Linear Technologies, Milpitas, Calif. Output 48 of comparator 46 drives logic level input pin 4 of RFID tag chip 26. Output wires 50 and 52 of coil 34 are connected to power supply pins 1, 8 of RFID chip 26 for providing power to RFID chip 26.

Test points TP1 and TP2 are used to set the threshold of comparator 46 at pins 3 and 4 to trip when the position of core 45 of DVRT sensor 22 is at center null. This is necessary to correct for variation in offset current caused by comparator 46, mismatch in forward voltage drop of diodes 42 and to eliminate offset caused by variations in distance d to RFID reader 24. Capacitor C1 tunes receive coil 34 to resonance at the excitation frequency of RFID reader 24. Pins 3 and 4 of comparator 46 (U2) are comparator differential plus and minus inputs, respectively. RFID chip 26 (U1) pin 5 supplies DC power to comparator 46 (U2) pin 7, the comparator power input. RFID chip 26 and comparator 46 are examples of second elements of circuit 20 that use dc obtained from the ac signal derived in coil 34. Test point TP3 provides output 8 of comparator 46 and is used to ensure that potentiometer R1 is set to the correct value so comparator 46 switches when core 45 moves suffciently. Signal 48 from pin 8 of comparator 46 (U2) is presented to sensor input pin 4 of RFID chip 26 (U1).

Figure 3:
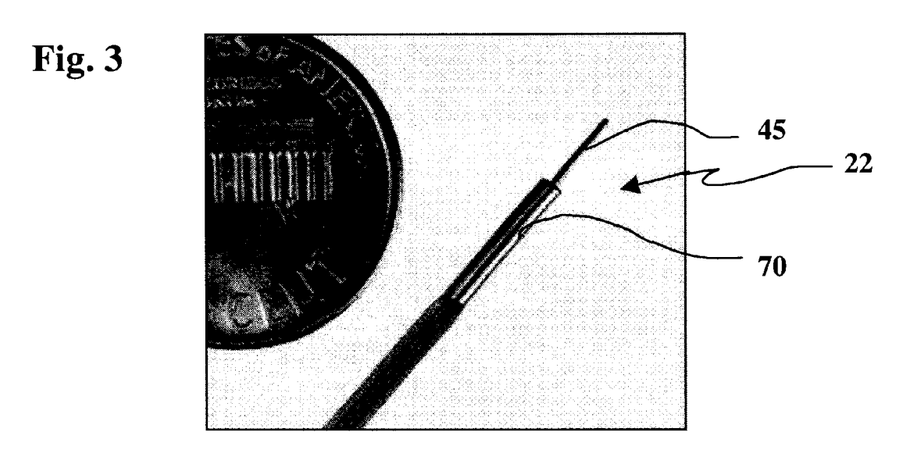
FIG. 3 is a photograph of a packaged sensor of the present invention.
Figures 4A, 4B:
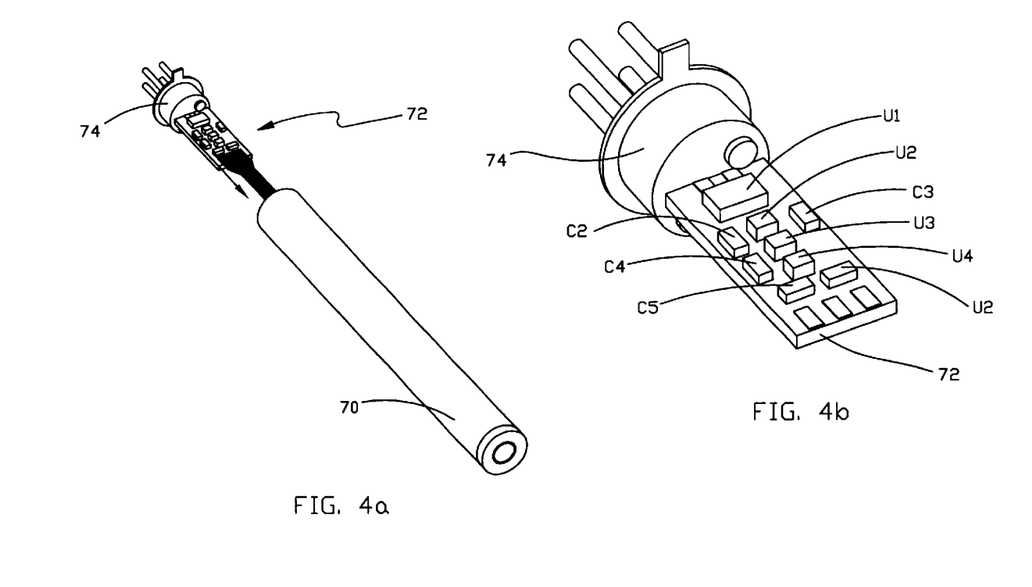
FIGS. 4a–4d show cutaway and cross sectional views of the packaged sensor of the present invention.
Figure 4C:
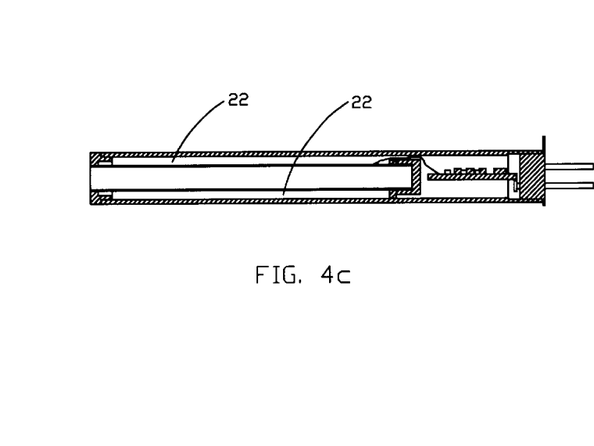
Figure 4D:
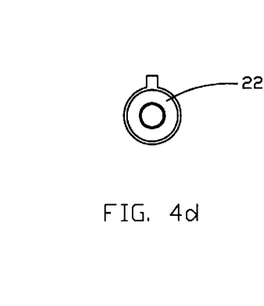

Circuit 20 also includes elements for balancing Wheatstone bridge 58 formed from center tapped DVRT 22 and resistors R3 and R4. Resistors R3 and R4 are examples of elements for balancing Wheatstone bridge 58, and their resistances can be selected to control the switch point of comparator 46 for a given application In addition to requiring only microwatt power levels and exhibiting relatively long read ranges, circuit 20 is so elegant it may be integrated within 3/16" (4.76 mm) outside diameter stainless steel hermetic sensor package 70, as shown in FIGS. 3 and 4a. Such an all-stainless and glass package has been validated using helium leak detection methods under MIL-STD-883E. Circuit 20 has its components mounted on circuit board 72 connected to hermetic header 74 and to DVRT sensor 22, as shown in FIGS. 4a, 4b, 4c, 4d.

Circuit board 62 was exposed to a heat source independently of DVRT sensor 22 and allowed to stabilize at several different temperatures from 20 to 45° C. Temperature was monitored u sing a type J thermocouple and handheld meter (Omega temperature monitor, model CC25). The displacement at which the preset threshold was detected by passive RFID circuit 20 was measured using a precision digital micrometer stand (Mitutoyo model 164–162, resolution: 1 micron, overall accuracy: 4 microns). The micrometer position at which the DVRT threshold was detected by RFM circuit 20 is plotted vs. temperature in FIG. 5. From this curve it is apparent that the temperature coefficient of signal conditioner circuit 20 is below the minimum calibrator resolution, which is 1 micron.

Figure 6:
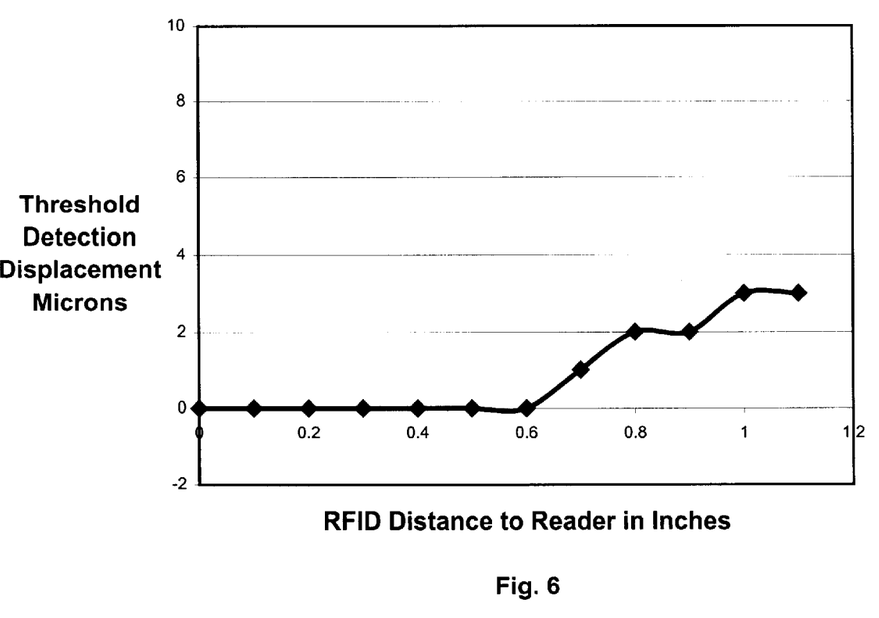
FIG. 6 is a graph showing RFID circuit distance from interrogator vs. threshold detection displacement.

The effect on threshold caused by variations in distance d between reader coil 32 and tag coil 34 were measured by inserting shims in 0.1" increments between tag coil 34 and reader coil 32. As shown in FIG. 6, there was no apparent change in the position threshold versus distance from the reader up to the point where the excitation signal dropped below the forward voltage drop of the rectifier at approximately 0.7". The current draw of RFID tag chip 26 was 5 microamps, and the comparator draw was 250 nanoamps. Minimum excitation current for the DVRT only was approximately 1 microamp RMS. The total current drawn by the entire sensing RFID tag was measured at 6.25 microamps, little more than the current drawn by RFID chip 26 alone.

The measurements show that a remotely interrogated displacement alarm sensor can be provided with a threshold resolution of 1 micron, an extremely low temperature coefficient of trip threshold, and the ability to respond with the usual 56 bit serial number of RFID tag chip 26 as well as the status of the sensor with respect to a threshold. In addition to requiring only microwatt power levels and exhibiting relatively long read ranges, circuit 20 is simple enough to be integrated within sensor package 70. The thermal stability and repeatability of the passive RFID threshold detection system has been demonstrated to achieve micron to submicron displacement resolution. This level of performance exceeds that of other sensors, such as TRIP steels. Passive peak strain sensor 22 combined with RFID tag chip 26 can be successfully used to create very economical smart structures.

While several embodiments of the invention, together with modifications thereof, have been described in detail herein and illustrated in the accompanying drawings, it will be evident that various further modifications are possible without departing from the scope of the invention. Nothing in the above specification is intended to limit the invention more narrowly than the appended claims. The examples given are intended only to be illustrative rather than exclusive.

What is claimed is:

1. An electronic device powered by a remote source of electromagnetic radiation, comprising:
   an antenna for receiving a radiated electromagnetic signal from the remote source, wherein the radiated electromagnetic signal induces an ac signal in said antenna; and
   a first element and a second element, said first element having a moveable mechanical member, said first element for providing an electrical signal, wherein magnitude of said electrical signal depends on position of said moveable mechanical member, wherein said first element uses an ac signal derived from said ac signal induced in said antenna, and wherein said second element includes a circuit that uses a dc signal derived from said ac signal induced in said antenna.

2. An electronic device as recited in claim 1, wherein said first element includes a sensor and wherein said mechanical member is part of said sensor.

3. An electronic device as recited in claim 2, wherein said sensor comprises a resistive, inductive, or capacitive sensor.

4. An electronic device as recited in claim 3, wherein said sensor comprises a Wheatstone bridge.

5. An electronic device as recited in claim 4, further comprising an element for balancing said Wheatstone bridge.

6. An electronic device as recited in claim 5, wherein said element for balancing said Wheatstone bridge comprises a resistor.

7. An electronic device as recited in claim 2, wherein said sensor comprises a DVRT.

8. An electronic device as recited in claim 7, wherein said DVRT comprises a peak detecting DVRT.

9. A electronic device as recited in claim 8, wherein said peak detecting DVRT comprises a peak displacement DVRT.

10. An electronic device as recited in claim 7, wherein said circuit that uses said dc signal includes a comparator, wherein said DVRT comprises a portion of a Wheatstone bridge, wherein said comparator is connected across said Wheatstone bridge so it is sensitive only to differential voltage between sides of said bridge.

11. An electronic device as recited in claim 10, wherein said circuit that uses said dc signal further includes an RFID chip.

12. An electronic device as recited in claim 2, wherein said circuit powered by said dc signal includes a circuit element used for reading said sensor.

13. An electronic device as recited in claim 12, wherein said circuit element used for reading said sensor includes an RFID circuit.

14. An electronic device as recited in claim 2, wherein said second element provides a reading of said sensor as to whether a measurement made by said sensor exceeds a threshold.

15. An electronic device as recited in claim 2, wherein said mechanical member comprises a core.

16. An electronic device as recited in claim 15, wherein said core comprises superelastic nickel titanium.

17. An electronic device as recited in claim 1, wherein said antenna is part of a resonant circuit.

18. An electronic device as recited in claim 1, wherein said electromagnetic signal comprises an RF signal.

19. An electronic device as recited in claim 1, wherein said second element includes an RFID circuit and a comparator circuit, wherein said RFID circuit has a power supply for generating said dc signal from said ac signal for operating said RFID chip, wherein said comparator circuit is connected to receive said dc signal generated by said power supply.

20. An electronic device as recited in claim 1, wherein said second element comprises an RFID circuit connected to said antenna.

21. An electronic device as recited in claim 20, wherein said ac signal provides power to a power supply for said RFID circuit.

22. An electronic device as recited in claim 1, wherein said first element and said second element receive all of their power from said antenna.

23. An electronic device as recited in claim 1, further comprising said remote source, wherein said remote source is located at a distance equal to or less than 1.1 inches from said antenna.

24. An electronic device as recited in claim 1, wherein said second element includes an RFID tag chip and wherein said first element and said second element including said RFID tag chip draws a current of about 6 microamps.

25. An electronic device, as recited in claim 1, wherein said first element and said second element get all their power from said radiated electromagnetic signal.

26. An electronic device, as recited in claim 1, wherein said antenna comprises a coil.

27. An electronic device powered by a remote source of electromagnetic radiation, comprising:
   an antenna for receiving the radiation from the remote source, wherein the radiation induces a signal in said antenna; and
   a sensor and a circuit for reading said sensor, wherein said sensor uses an ac signal derived from said signal induced in said antenna, and wherein said circuit for reading said sensor uses a dc signal derived from said signal in said antenna.

28. An electronic device as recited in claim 27, wherein said sensor comprises a DVRT.

29. An electronic device, as recited in claim 27, wherein said circuit for reading said sensor comprises an RFID circuit.

30. An electronic device, as recited in claim 29, wherein said RFID circuit is connected to use a portion of said ac signal in said antenna, wherein said RFID circuit comprises a power supply for generating said dc signal from said ac signal for operating said RFID circuit.

31. An electronic device, as recited in claim 27, wherein said circuit for reading said sensor further comprises a comparator, wherein said comparator uses said dc signal generated by said RFID circuit.

32. An electronic device, as recited in claim 27, wherein said circuit for reading said sensor gets all its power from said radiated electromagnetic signal.

33. An electronic device, as recited in claim 27, wherein said antenna comprises a coil.

34. A method of reading a remote sensing device, comprising the steps of:

providing a reader capable of radiating an electromagnetic signal;

providing said remote sensing device, wherein said remote sensing device comprises an antenna for receiving said radiated electromagnetic signal from said reader, wherein said radiated electromagnetic signal is for inducing a signal in said antenna, wherein said remote sensing device further comprises a sensor and a circuit for reading said sensor connected to said sensor, wherein said sensor uses an ac signal derived from said signal induced in said antenna and provides an output signal to said circuit for reading said sensor, and wherein said circuit for reading said sensor includes a device that uses a dc signal derived from said signal induced in said antenna; and bringing said reader in range of said remote sensing device.

35. A method as recited in claim 34, wherein said sensor further comprises a mechanical member, and wherein said circuit for reading said sensor determines the location of said mechanical member.

36. A method as recited in claim 34, wherein said sensor comprises a Wheatstone bridge and said reading step comprises reading the degree of unbalance of the Wheatstone bridge.

37. A method as recited in claim 36, further comprising the step of balancing said Wheatstone bridge.

38. A method as recited in claim 34, wherein said sensor comprises a DVRT.

39. A method as recited in claim 38, wherein said DVRT comprises a peak detecting DVRT.

40. A method as recited in claim 39, wherein said DVRT comprises a peak displacement DVRT.

41. A method as recited in claim 38, wherein said circuit for reading further comprises an RFID chip and wherein said reading step comprises using said RFID chip to transmit information that is in said DVRT.

42. A method as recited in claim 34, further comprising the step of providing power for said remote sensing device with said electromagnetic signal.

43. A method, as recited in claim 34, wherein said remote sensing device gets all its power from said radiated electromagnetic signal.

44. A method, as recited in claim 34, wherein said antenna comprises a coil.

45. A method of reading a remote device, comprising the steps of:

providing a reader capable of radiating an electromagnetic signal;

bringing said reader in range of a remote device, said remote device comprising an antenna capable of receiving said radiated electromagnetic signal from said reader;

radiating said remote device with said electromagnetic signal from said reader, wherein said electromagnetic signal induces a signal in said antenna, wherein said remote device further comprises a circuit comprising a first element and a second element connected to said first element, said first element having a moveable mechanical member, said first element for providing an electrical signal to said second element, wherein magnitude of said electrical signal depends on position of said moveable mechanical member;

wherein said first element uses an ac signal derived from said antenna for other than generating dc power; and generating a dc signal from said signal induced in said antenna, wherein said second element uses said dc signal.

46. A method, as recited in claim 45, wherein said remote device gets all its power from said radiated electromagnetic signal.

47. A method, as recited in claim 45, wherein said antenna comprises a coil.

48. An electronic device for receiving a radiated electromagnetic signal transmitted by a remote source, comprising:

an antenna for receiving the radiated electromagnetic signal transmitted by the remote source, wherein the radiated electromagnetic signal induces a signal in said antenna; and a first element and a second element connected to said first element, wherein said first element is connected to receive an ac input signal derived from said signal induced in said antenna, further wherein said second element uses a dc signal derived from said signal in said antenna, and wherein said first element and said second element are connected in s a circuit to get all their power from said signal induced in said antenna.

49. An electronic device, as recited in claim 48, wherein said first element comprises a sensing function.

50. An electronic device, as recited in claim 48, wherein said first element comprises a sensor, and wherein said second element is for reading said sensor.

51. An electronic device, as recited in claim 50, wherein said sensor comprises a DVRT, and wherein said second element comprises an integrated circuit for reading said DVRT.

52. An electronic device, as recited in claim 48, wherein said antenna comprises a coil.

* * * * *